Figure 1:
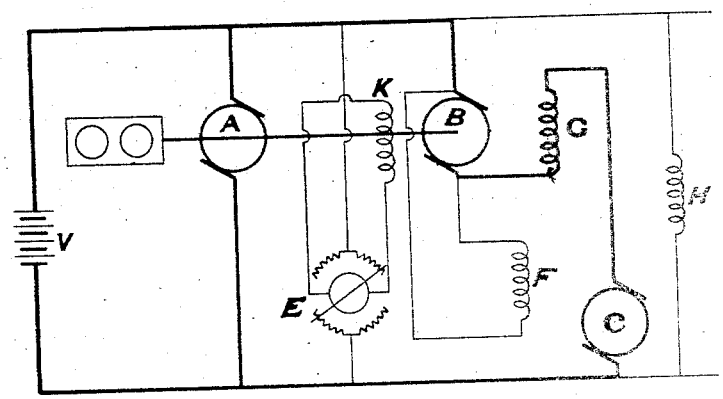

J. C. MACFARLANE & H. BURGE.
ELECTRICALLY OPERATED MOTOR VEHICLE.
APPLICATION FILED JUNE 6, 1912.

1,049,247.

Patented Dec. 31, 1912.

Witnesses.

Inventors
James C. Macfarlane
Henry Burge

UNITED STATES PATENT OFFICE.

JAMES C. MACFARLANE AND HENRY BURGE, OF ARC WORKS, CHELMSFORD, ENGLAND, ASSIGNORS TO CROMPTON & COMPANY LIMITED, OF CHELMSFORD, ENGLAND.

ELECTRICALLY-OPERATED MOTOR-VEHICLE.

1,049,247.

Specification of Letters Patent. Patented Dec. 31, 1912.

Application filed June 6, 1912. Serial No. 702,125.

*To all whom it may concern:*

Be it known that we, JAMES COLQUHOUN MACFARLANE and HENRY BURGE, subjects of the King of Great Britain, residing at Arc Works, Chelmsford, in the county of Essex, England, have invented certain new and useful Improvements in Electrically-Operated Motor-Vehicles, of which the following is a specification.
This invention relates to a modification of an electrical regenerative control system already described by us in certain earlier United States Patents and is especially applicable to electrically operated motor vehicles.

In our previous United States Letters Patent No. 980979, dated January 10, 1911, and No. 998364, dated July 18, 1911, we described an electrical system suitable among other purposes for driving the road wheels of a motor vehicle.

The present invention is a modification of such system which comprised two working motors operating separately. Thus in the application to a motor vehicle the separate motors operated the driving wheels of the vehicle separately.

The separate motors as described in United States Letters Patent Nos. 980979 and 998364 are connected with their armatures in series with a generator across the mains, or leads from a battery, and are provided with regulating field coils in series with one another and with one of the motors across the line, the said generator being provided with a reversible shunt excitation controlled by a regulator and with a starting switch. In many cases it is desirable, however, to employ a single motor and under such circumstances, we modify the aforesaid system, and obtain the automatic regulation of the single motor in a different way.

According to this invention we employ a motor and a generator whose armatures are coupled together (or alternatively a motor generator having a divided armature) the generator of the motor generator supplying current to the single working motor and the motor of the motor generator obtaining its energy from a battery, or the energy may be obtained partly from a battery and partly from a petrol engine or prime mover coupled to the shaft of the motor generator, and adapted to take the mean load.

The driving motor is provided with two sets of field windings one winding called the "constant excitation winding" being arranged across the battery leads and the second winding called the "auxiliary winding" instead of being arranged as described in the said earlier United States Letters Patent in series with the armature of one of the driving motors across the leads, is arranged across the brushes of the aforesaid generator.

The generator of the motor generator is provided with a safety winding whose effect is different according as the motor is being driven by the current or is returning energy to the line. When current is being supplied to the driving motor from the generator, increase of such current causes the aforesaid generator safety winding to reduce the voltage of the supply thus limiting the current flowing, and when the supply voltage is below the back E. M. F. of the driving motor so that the motor is returning energy, the said safety winding increases the voltage of the supply so as to limit the amount of the current returned to the line by the working motor.

In order that the invention may be clearly understood we proceed to describe the same with reference to the accompanying drawings in which—

Figure 2:
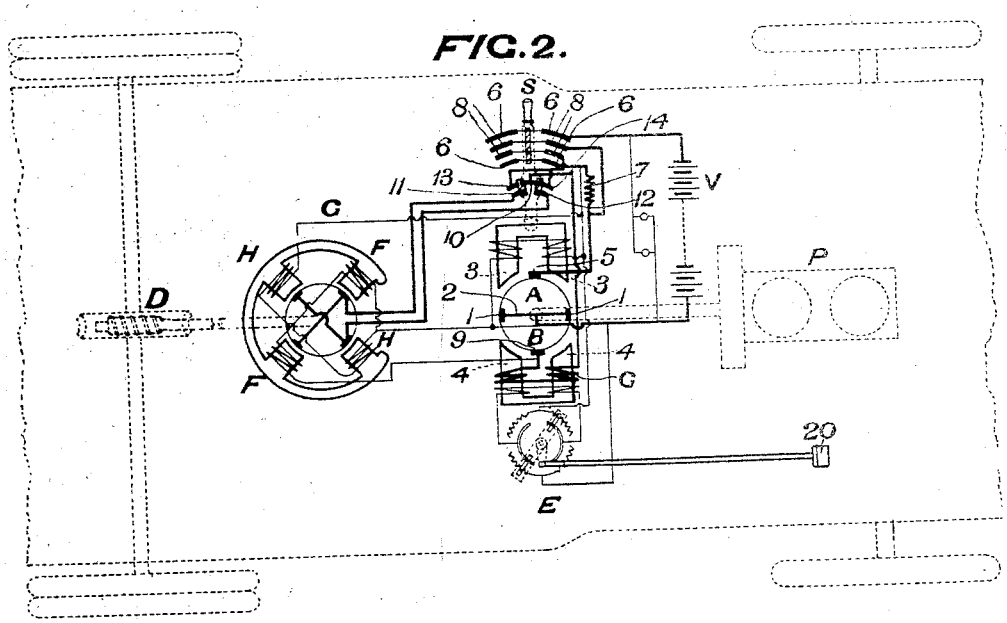

Figure 1 represents diagrammatically the system employed and Fig. 2 represents the application of the system to an electrically operated motor vehicle.

Referring to Fig. 1, A is the motor and B the generator, C is the working motor whose armature is connected in series with B across the mains to which energy is supplied by the battery V. A petrol engine or other prime mover may be mounted on the shaft of the motor generator to take the mean load. The motor A is a separately excited machine whose armature is across the mains. The generator B is provided with a variable reversible shunt excitation K controlled by the regulator E. When the regulator E is over to the right (say), the generator adds its voltage to the battery and can boost the volts on the motor C up to twice the battery voltage, but when the regulator is to the left, the generator B boosts the volts on the motor C down to zero. The motor C is provided with two sets of windings namely a winding H arranged across the mains providing a constant excitation and an auxiliary winding F arranged across the brushes of the generator. The current in the winding F is arranged to assist the winding H when the generator B is negatively excited, and to oppose the winding H when the generator is positively excited. Thus at slow speeds the winding F gives a strong field, as it assists the winding H, but at high speeds when the generator is fully positively excited the winding F opposes the winding H and the field becomes weak thus allowing the motor to take a considerable current even at high speeds.

The generator B is provided with a series winding G of the type known as a safety winding which has a considerable influence on the current flowing in the motor winding F. The effect of the safety winding is as follows:—When a positive current flows through the safety winding G tending to drive the motor C the winding G tends to negatively excite the generator B; whereas if the current is being returned to the line and is negative in direction, the safety winding tends to positively excite the generator B. Consequently at starting under load, the safety winding regulates the volts of B so as to reduce the flow of current whereas when energy is being returned to the line it tends to reduce the flow of current in such reverse direction.

The motor winding F is so wound that when B is negatively excited, the winding F assists the winding H, and when B is positively excited it opposes the winding H. Consequently when current is being supplied to the motor, and the safety winding G is tending to negatively excite the generator B, the safety winding increases the helping effect of the winding F, but when current is being returned to the line it reduces the helping effect.

By the combination of the safety winding G, and the winding F arranged across the brushes of the generator B, we obtain a perfectly automatic regulation with high torque at low speeds, the capacity to rotate at high speeds and still take sufficient current to develop a considerable torque, a capacity for regenerative braking till the motor actually stops, together with absolute immunity from the possibility of overloading any part of the apparatus.

We now proceed to describe with reference to Fig. 2 the arrangements of the above circuits and apparatus on the chassis of a motor vehicle. Referring to Fig. 2, C is the working motor shown as geared to the back wheels by a worm drive D. A motor generator of the type in which a single armature divided into a motor and a generator portion by short circuited brushes and rotating in a divided field is shown to the right of said working motors, the upper portion of the armature A represents the motor half of the armature, the lower half B represents the generator portion of the armature. 1, 1, are brushes connected by the conductor 2 which divide the armature electrically into the said motor and generator portions. The motor portion of the armature rotates in the field 3, 3, and the generator portion rotates in the field 4, 4. Current is led into the motor portion of the armature A from the battery V between the short circuited brushes 1, 1, and the brush 5. The circuit is completed through the starting switch shown diagrammatically at S to the other pole of the battery. The upper portion of said switch S which is shown in the neutral position starts up the motor generator when moved over either to the right or left, contact being first made through the contact 6, 6, so that the starting resistance 7 is included in the circuit, but a further motion of the lever to the right or left bridges over the contact 8, 8, and thus cuts out the resistance. The lower part of the switch S is a reversing switch in the main circuit of the working motors whose function will be explained later.

The current supplied to the working motor C is obtained from the battery V, and the generator half of the motor generator, which are arranged in series with the motor C, the circuit being as follows:—The current may be regarded as starting from the positive pole of the battery marked + and then enters the generator portion of the armature B by the brushes 1, 1, and leaves it by the brush 9, it then traverses the series winding G on the generator field 4 and passes to the central contact 10 of the lower or reversing portion of the switch S from whence it is led to the working motor C through one or other of the contacts 11, 12, according to the position of the switch S, returning through the corresponding contact 13 or 14, to the contact 8 thence through the blade of the switch to the contact 6, and so back to the other or negative terminal of the battery V. It will thus be seen that the battery, the generator and the motor C are all in series. The excitation of the generator field 4, 4, is derived from the battery through the intervention of a variable reversible shunt regulator marked E, the constant excitation of the motor field 3, 3, is obtained directly from the battery. By means of the regulator E, the generator can be caused to give any voltage from zero up to the voltage of the battery in either direction, that is, it can either assist or oppose the battery so that the voltage on the working motor C can be boosted down to nothing or up to twice the voltage of the battery. The working motor is as has already been described provided with constant excitation windings H, H, and auxiliary windings F, F, arranged across the brushes of the generator B. The electrical effect of these windings has been fully described with reference to Fig. 1. We control the regulator E by means of a foot pedal 20 and the pedal 20 and the switch S are the only means of control required. We may employ a petrol engine or other prime mover P mounted on the shaft of the motor generator, provided with a drooping speed torque characteristic, to take the mean load, in which case the size of the battery required is greatly reduced.

What we claim is:—

1. In a system for the propulsion of the driving wheels of a self-propelled vehicle, an electric motor connected so as to drive both said driving wheels, a source of power supplying energy to said electric motor, said source of power including a battery and a motor generator having a motor element and a generator element, a starting and reversing switch, a variable controller for said source of power, a single foot pedal operably connected to said variable controller, and means to regulate automatically the torque of said electric motor when the vehicle is running at low speeds and also for braking the vehicle electrically.

2. In a system for the propulsion of the driving wheels of a self-propelled vehicle, an electric motor connected so as to drive both said driving wheels, a source of power supplying energy to said electric motor, said source of power including a battery and a motor generator having a motor element and a generator element, said battery, motor generator and electric motor being arranged in series, a starting and reversing switch, a variable controller for said source of power, a single foot pedal operably connected to said variable controller, and means to regulate automatically the torque of said electric motor when the vehicle is running at low speeds and also for braking the vehicle electrically.

3. In a system for the propulsion of the driving wheels of a self-propelled vehicle, an electric motor connected so as to drive both said driving wheels, a source of power supplying energy to said electric motor, said source of power including a battery and a motor generator having a motor element and a generator element, said battery, motor generator and electric motor being arranged in series, a starting and reversing switch, a variable reversible shunt regulator connected with said battery and with said motor generator, a single foot pedal operably connected to said variable reversible shunt regulator, and means to regulate automatically the torque of said electric motor when the vehicle is running at low speeds and also for braking the vehicle electrically.

4. In a system for the propulsion of the driving wheels of a self-propelled vehicle, an electric motor connected so as to drive both said driving wheels, a source of power supplying energy to said electric motor, said source of power including a battery and a motor generator having a motor element and a generator element, said battery, motor generator and electric motor being arranged in series, a starting and reversing switch, a variable reversible shunt regulator connected with said battery and with said generator element for the excitation of the field of said generator element, a single foot pedal operably connected to said variable reversible shunt regulator, and auxiliary field winding on said motor and arranged across said generator, and a series field winding on said generator, said windings combining to regulate automatically the torque of said electric motor when the vehicle is running at low speeds and also for braking the vehicle electrically.

5. In a system for the propulsion of the driving wheels of a self-propelled vehicle, an electric motor connected so as to drive both said driving wheels, a source of power supplying energy to said electric motor, said source of power including a battery and a motor generator having a motor element and a generator element, a prime mover coupled directly to said motor generator, said battery, motor generator and electric motor being arranged in series, a starting and reversing switch, a variable reversible shunt regulator connected with said battery and with said generator element for the excitation of the field of said generator element, a single foot pedal operably connected to said variable reversible shunt regulator, an auxiliary field winding on said motor and arranged across said generator, and a series field winding on said generator, said windings combining to regulate automatically the torque of said electric motor when the vehicle is running at low speeds and also for braking the vehicle electrically.

6. In a system for the propulsion of the driving wheels of a self-propelled vehicle, an electric motor connected so as to drive both said driving wheels, a source of power supplying energy to said electric motor, said source of power including a battery and a motor generator having a motor element and a generator element, an internal combustion engine coupled directly to said motor generator, said battery, motor generator and electric motor being arranged in series, a starting and reversing switch, a variable reversible shunt regulator connected with said battery and with said generator element for the excitation of the field of said generator element, a single foot pedal operably connected to said variable reversible shunt regulator, an auxiliary field winding on said motor and arranged across said generator, and a series field winding on said generator, said windings combining to regulate automatically the torque of said electric motor when the vehicle is running at low speeds and also for braking the vehicle electrically.

In testimony whereof we have hereunto set our hands in presence of two subscribing witnesses.

JAMES C. MACFARLANE.
HENRY BURGE.

Witnesses:
HARRY JOHN STOGDEN,
ERNEST JOHN HILL.